(12) United States Patent
Zhang et al.

(10) Patent No.: US 11,169,324 B2
(45) Date of Patent: Nov. 9, 2021

(54) BROADBAND DISPERSION CONTROLLING WAVEGUIDE AND CONTROLLING METHOD

(71) Applicant: TIANJIN UNIVERSITY, Tianjin (CN)

(72) Inventors: Lin Zhang, Tianjin (CN); Yuhao Guo, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 16/965,195

(22) PCT Filed: Jan. 24, 2019

(86) PCT No.: PCT/CN2019/072956
§ 371 (c)(1),
(2) Date: Jul. 27, 2020

(87) PCT Pub. No.: WO2019/144903
PCT Pub. Date: Aug. 1, 2019

(65) Prior Publication Data
US 2021/0063639 A1 Mar. 4, 2021

(30) Foreign Application Priority Data
Jan. 27, 2018 (CN) .......................... 201810087623.5

(51) Int. Cl.
*G02B 6/12* (2006.01)
*G02B 6/122* (2006.01)
*G02B 6/132* (2006.01)

(52) U.S. Cl.
CPC .......... *G02B 6/1223* (2013.01); *G02B 6/132* (2013.01); *G02B 2006/12038* (2013.01)

(58) Field of Classification Search
CPC .................. G02B 6/1223; G02B 6/132; G02B 2006/12038
(Continued)

(56) References Cited

U.S. PATENT DOCUMENTS 8,483,529 B2 7/2013 Zhang et al.
2002/0172456 A1* 11/2002 Hosomi ............. G02B 6/29317
385/27
(Continued)

FOREIGN PATENT DOCUMENTS

CN 101952755 A 1/2011
CN 105629380 A * 6/2016 ............. G02B 6/122
(Continued)

OTHER PUBLICATIONS

International Search Report issued in corresponding International Application No. PCT/CN2019/072956, dated Apr. 25, 2019, pp. 1-3, The State Intellectual Property Office of the P.R. China, Beijing, China.
(Continued)

*Primary Examiner* — Jerry M Blevins
(74) *Attorney, Agent, or Firm* — Hauptman Ham, LLP

(57) ABSTRACT

An optical waveguide structure has a waveguide core including an inner and an outer layer with different refractive indices, and a refractive index ratio of the different refractive indices is greater than or equal to 1.15. A dispersion controlling method using the optical waveguide structure includes: first, obtaining a dispersion curve having up to 5 zero-dispersion wavelengths by calculating based on a set of preset structural size parameters of the optical waveguide; and then, adjusting one or more of the width (W) of a contact surface between the inner layer and the substrate, the thickness (H) of a higher refractive index material, and the thickness (C) of a lower refractive index material, so as to implement dispersion control.

16 Claims, 3 Drawing Sheets

(58) Field of Classification Search
USPC .......................................................... 385/129
See application file for complete search history.

(56) References Cited

U.S. PATENT DOCUMENTS

2011/0206323 A1* 8/2011 Zhang ................ G02B 6/12007
  385/50
2015/0212386 A1* 7/2015 Patel ...................... G02B 6/136
  385/3

FOREIGN PATENT DOCUMENTS

| CN | 105629380 A | 6/2016 |
| CN | 108415122 A | 8/2018 |

OTHER PUBLICATIONS

First Chinese Office Action issued in corresponding Chinese Application No. 201810087623.5, dated May 14, 2019, pp. 1-6, The State Intellectual Property Office of the P.R. China, Beijing, China.
Second Chinese Office Action issued in corresponding Chinese Application No. 201810087623.5, dated Oct. 28, 2019, pp. 1-3, The State Intellectual Property Office of the P.R. China, Beijing, China.
Chen, P., "Silicon-Based Microring Resonator and the Applications," Electronic Technology & Information Science, China Doctoral Dissertations Full-Text Database, No. 01, Jan. 15, 2016.

\* cited by examiner

BROADBAND DISPERSION CONTROLLING WAVEGUIDE AND CONTROLLING METHOD

The present application is a National Phase of International Application Number PCT/CN2019/072956, filed Jan. 24, 2019, which claims priority to Chinese Application No. 201810087623.5, filed Jan. 27, 2018, and are hereby incorporated by reference in their entirety into the present application.

BACKGROUND

The present disclosure relates to a broadband dispersion controlling waveguide and a controlling method, which belong to the field of waveguide optics and micro- and nano-integrated optics.

Waveguide refers to the structure used for directionally guiding electromagnetic waves. As common waveguide structures, there are parallel double-line waveguide, coaxial line waveguide, parallel plate waveguide, rectangular waveguides, and optical fiber etc. The chromatic dispersion refers to the phenomenon that the propagation speeds of light of different frequencies in the medium are different, and in the field such as communication, the chromatic dispersion can cause distortion of the signals carried by light. At present, the waveguide optics and micro- and nano-integrated optics technology is booming. How to control chromatic dispersion of integrated optical waveguides, so to achieve applications such as chromatic dispersion compensation, low chromatic dispersion and chromatic dispersion-free transmission, generation of supercontinuum spectrum and optical frequency comb, has become research popularity. By designing the waveguide structure and selecting suitable materials for optical waveguides, it is possible to effectively change waveguide dispersion and obtain zero-dispersion wavelengths with controllable position and quantity, thus flexibly controlling chromatic dispersion. In the patent document with the publication number of U.S. Pat. No. 8,483,529B2 and the publication date of Jul. 9, 2013, a "Waveguide-based dispersion device" is disclosed, in which a structure is designed to have a slot waveguide coupled with a strip waveguide, so that this structure introduces a mode transition mechanism and thus enables chromatic dispersion control. In the patent document with the publication number of U.S. Pat. No. 9,110,219B1 and the publication date of Aug. 18, 2015, an "On-chip two-octave supercontinuum generation enabled by advanced chromatic dispersion tailoring in slotted waveguides" is disclosed, in which an improved slot waveguide structure is designed, and can enable 4 zero-dispersion wavelengths to appear in the curve of chromatic dispersion value varying along with wavelength, which curve has a shape similar to a saddle, so that chromatic dispersion control can be realized more flexibly. Here, the "4 zero-dispersion wavelengths" is also the largest number of achievable zero-dispersion wavelengths that has been reported so far. In this kind of waveguide structures, the core region has an arrangement of three layers with a high-low-high refractive index distribution from top to bottom, and the parameters of the waveguide used for chromatic dispersion control are the heights of the three material regions and the width of the waveguide core, i.e., four parameters in total. The technique for processing such a three-layer-structured waveguide is complicated, having a high demanding for processing condition, and such a structure requires a relatively high ratio between a high-index material and a low-index material. There are few material combinations applicable to such a structure, and this structure can produce up to 4 zero-dispersion wavelengths.

SUMMARY

As the previously reported waveguides for controlling the chromatic dispersion have high demanding for processing conditions, the present disclosure provides a new method for controlling the chromatic dispersion in view of the defect in related art, which can reduce the structural parameters required for controlling the chromatic dispersion and depress the requirements for processing conditions. In the meantime, based on the design of the waveguide of the present application, it is possible to generate up to 5 zero-dispersion wavelengths.

In order to solve the above technical problems, the present disclosure provides a novel optical waveguide structure comprising a waveguide core located on a substrate, wherein the waveguide core is provided with a cladding layer; the waveguide core comprises two layer formed of materials with different refractive indices, having an inner layer and an outer layer; the inner layer requires two processing techniques, that is, deposition and etching, and the outer layer only requires the processing technique of deposition, the refractive index ratio of the different refractive indices of the two layers of materials is ≥1.15, and such a waveguide can produce up to 5 zero-dispersion wavelengths.

Further, the materials for the two layers with different refractive indices are selected from the same combination or from different combinations of a first combination, a second combination and a third combination as follows:

The first combination is a chalcogenide glass combination comprising S-based glass of lower refractive index and Se-based glass and Te-based glass of higher refractive index; the S-based glass at least comprises $Ge_2S_3$, $As_2S_3$, $Ge_xAs_yS_z$ and $Ge_xP_yS_z$, the Se-based glass at least comprises $Ge_2Se_3$, $As_2Se_3$, $Ge_xAs_ySe_z$, $Ge_xSb_ySe_z$ and $Ge_xP_ySe_z$, and the Te-based glass at least comprises $Ge_xSb_yTe_z$, $Ge_xSe_yTe_z$ and $As_xSe_yTe_z$, wherein x, y, z represent different mole percentage, and x+y+z=100. The second combination at least comprises $TiO_2$, $HfO_2$, $Al_2O_3$, $SiO_2$, $Ga_2O_3$, $Ta_2O_3$, $Bi_2O_3$. The third combination at least comprises Ge, SiC, Si, $Ge_xSi_y$, Diamond, GaN, AlN, $Si_xN_y$, InP, GaAs, $LiNbO_3$. The x and y in the third combination represent different mole percentage, and x+y=100.

An optical resonance device and an optical interference device based on the above broadband dispersion controlling waveguide, that is, an optical resonance device and an optical interference device using the cross section of the broadband dispersion controlling waveguide of the present disclosure, are provided. Optical resonance devices at least include micro-ring resonator cavity and FP cavity, optical interference devices at least include Mach-Zindel Interferometer.

The method for controlling chromatic dispersion using the above on-chip integrated optical waveguide structure is: first, designing a set of structural size parameters of the optical waveguide, the set of structural size parameters comprising the width W of the contact surface between the waveguide core and the substrate, the thickness H of the A layer of the waveguide core, and the thickness C of the B layer of the waveguide core; and then obtaining a chromatic dispersion curve based on the second derivative of a transmission constant of light in the optical waveguide with respect to wavelength. The chromatic dispersion curve is a chromatic dispersion curve with up to 5 zero-dispersion wavelengths, and this chromatic dispersion curve is flat in a broadband wavelength range of two octaves.

By increasing the width W of the contact surface between the waveguide core and the substrate, the chromatic dispersion curve is shifted as a whole in the direction in which the anomalous dispersion value increases.

By increasing the thickness H of the A layer of the waveguide core, the chromatic dispersion curve is shifted as a whole in the direction in which the anomalous dispersion value increases.

By increasing the thickness C of the B layer of the waveguide core, the chromatic dispersion curve is rotated counterclockwise with the wavelength $\lambda_0$ as the center of rotation, where when the wavelength is less than 4, the chromatic dispersion curve moves in the direction in which the anomalous dispersion value decreases, and when the wavelength is greater than 4, the chromatic dispersion curve moves in the direction in which the anomalous dispersion value increases.

As compared to the related art, the present disclosure provides the following advantages:

by changing a core of an optical waveguide for controlling chromatic dispersion designed by predecessors into a two-layered structure having an inner layer and an outer layer, and at the same time, allowing the outer layer not to be etched, the processing steps required for the dispersion controlling waveguide are reduced and the requirements for processing conditions is lowered; and furthermore, such a structure can generate 5 zero-dispersion wavelengths, with an resulted flat dispersion bandwidth exceeding two octave bands.

BRIEF DESCRIPTION OF THE DRAWINGS

FIG. 1-2 is a schematic cross-sectional view of Structure 2 of the optical waveguide structure according to the present disclosure;

FIG. 1-3 is a schematic cross-sectional view of Structure 3 of the optical waveguide structure according to the present disclosure;

FIG. 2-1 is a graph showing chromatic dispersion varies along with a width W of a contact surface between a waveguide core and a substrate;

FIG. 2-2 is a graph showing chromatic dispersion varies along with a thickness H of the high-index material; and FIG. 2-3 is a graph showing chromatic dispersion varies along with a thickness C of the low-index material.

DETAILED DESCRIPTION

A further detailed description will be made to the technical solution of the present disclosure in conjunction with drawings and specific embodiments, and the described specific embodiments are used merely to explain the present disclosure, but not to limit the present disclosure.

Figure 1:
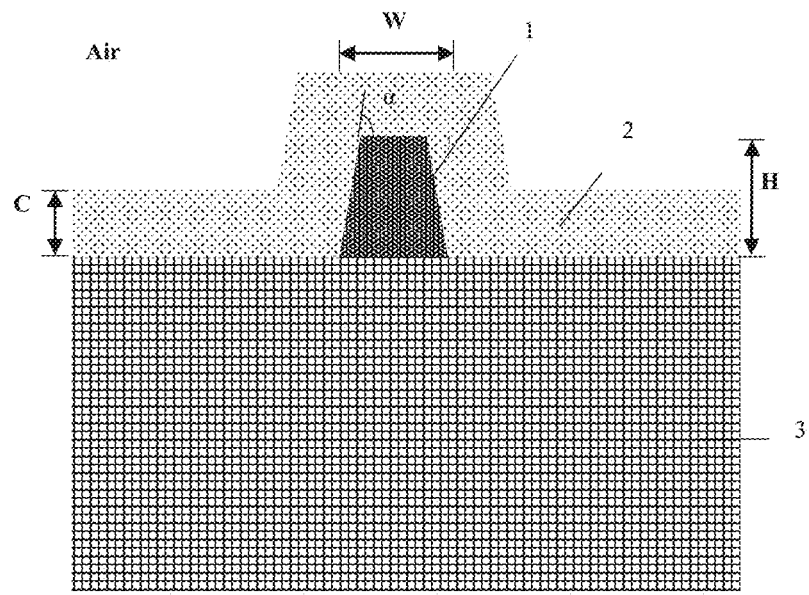
FIG. 1-1 is a schematic cross-sectional view of Structure 1 of the optical waveguide structure according to the present disclosure.

As shown in FIG. 1-1, the present disclosure provides a broadband dispersion controlling waveguide comprising a waveguide core located on the substrate 3, wherein the waveguide core comprises an A layer 1 and a B layer 2, the A layer has a sidewall angle α, α≥90°, the A layer 1 and B layer 2 are composed of materials with different refractive indices, and the refractive index ratio of the materials of the A layer 1 and the B layer 2 is ≥1.15; it is characterized in that the A layer 1 partially covers the substrate 3, thus forming a combined body of the A layer 1 and the substrate 3, the B layer 2 covers the upper side of the combined body; and the A layer 1 has a rectangular or trapezoid cross section.

Figures 1, 2:
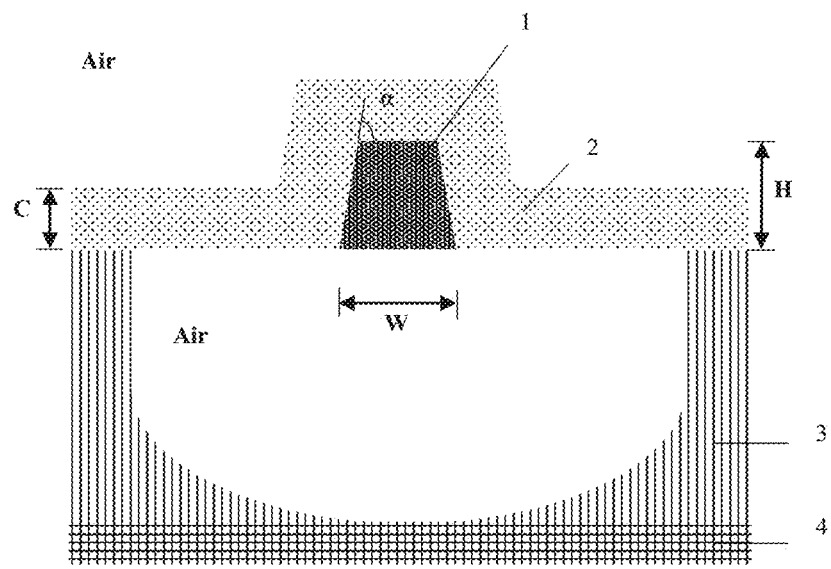

As shown in FIG. 1-2, an upper part of the substrate in a broadband dispersion controlling waveguide according to the present disclosure has a through groove along a light transmission direction, and it is recommended to use etching process with etching liquid to form the through groove in the present disclosure. Therefore, a material within the range of the height of the through groove uses a material 3 that can be etched by a selected etching liquid, while a material 4 at the bottom of the substrate uses a material that can not be etched by this etching liquid. In addition, the top part of the substrate comprises a support layer for the waveguide core, and in order to facilitate processing, a material of the support layer is preferably the same as that of the A layer.

Figures 1, 2, 3:
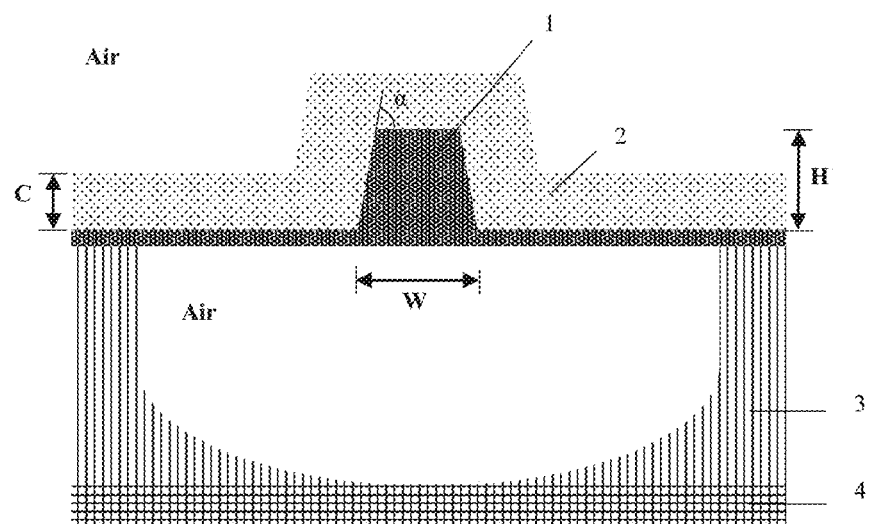
Figures 1, 2:
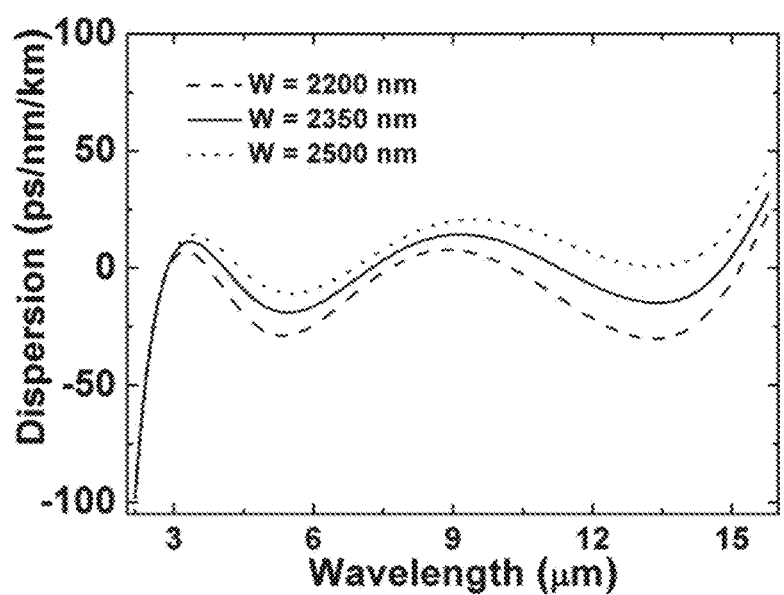
Figure 2:
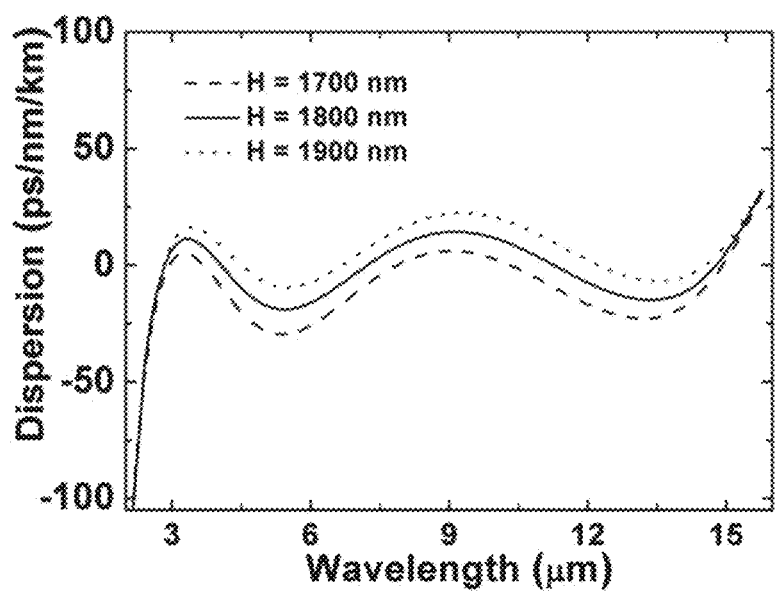
Figures 2, 3:
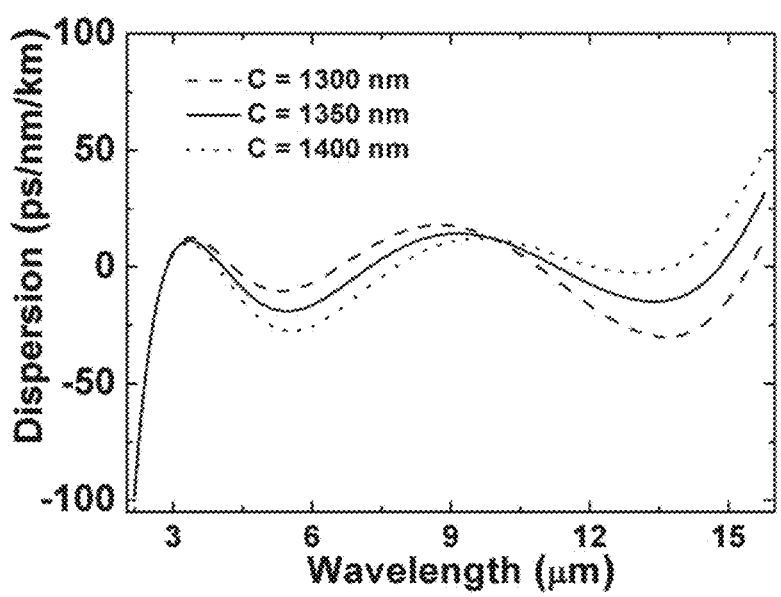

As shown in FIG. 1-3, an upper part of the substrate in a broadband dispersion controlling waveguide according to the present disclosure has a through groove along the light transmission direction, and it is recommended to use etching process with etching liquid to form the through groove in the present disclosure. Therefore, a material within the range of the height of the through groove uses a material 3 that can be etched by a selected etching liquid, while the material 4 at the bottom of the substrate uses a material that can not be etched by this etching liquid. In addition, the top part of the substrate comprises a support layer for the waveguide core, and in order to facilitate processing, a material of the support layer is preferably the same as that of the A layer.

In the present disclosure, the materials of the A layer and the B layer are selected from the same combination or from different combinations of a first combination, a second combination and a third combination.

The first combination is a chalcogenide glass combination comprising S-based glass of lower refractive index and Se-based glass and Te-based glass of higher refractive indices; the S-based glass at least comprises $Ge_2S_3$, $As_2S_3$, $Ge_xAs_yS_z$ and $Ge_xP_yS_z$, the Se-based glass at least comprises $Ge_2Se_3$, $As_2Se_3$, $Ge_xAs_ySe_z$, $Ge_xSb_ySe_z$ and $Ge_xP_ySe_z$, the Te-based glass at least comprises $Ge_xSb_yTe_z$, $Ge_xSe_yTe_z$ and $As_xSe_yTe_z$, wherein x, y, z represent different mole percentage, and x+y+z=100.

The second combination at least comprises $TiO_2$, $HfO_2$, $Al_2O_3$, $SiO_2$, $Ga_2O_3$, $Ta_2O_3$, and $Bi_2O_3$.

The third combination at least comprises Ge, SiC, Si, $Ge_xSi_y$, Diamond, GaN, AlN, $Si_xN_y$, InP, GaAs, and $LiNbO_3$, wherein the x and y in the third combination represent different mole percentage, and x+y=100.

A method for controlling chromatic dispersion is obtained by using the broadband dispersion controlling waveguide according to the present disclosure, in which first, designing a set of structural size parameters of an optical waveguide, the set of structural size parameters comprising a width W of a contact surface between the waveguide core and the substrate, a thickness H of the A layer 1 of the waveguide core, and a thickness C of the B layer 2 of the waveguide core; and then, obtaining a chromatic dispersion curve based on a second derivative of a transmission constant of light in the optical waveguide with respect to wavelength.

By reasonably adjusting value(s) of one or more of the width W of the contact surface between the waveguide core and the substrate, the thickness H of the A layer 1 of the waveguide core, and the thickness C of the B layer 2 of the waveguide core, the resulted chromatic dispersion curve can be a chromatic dispersion curve with up to 5 zero-dispersion wavelengths, and moreover, the chromatic dispersion curve is relatively flat in a broadband wavelength range, that is, the chromatic dispersion curve is flat in a broadband wavelength range of two octaves.

Based on the resulted chromatic dispersion curve, by increasing the width W of the contact surface between the waveguide core and the substrate, the chromatic dispersion curve is shifted as a whole in the direction in which the anomalous dispersion value increases; by increasing the thickness H of the A layer 1 of the waveguide core, the chromatic dispersion curve is shifted as a whole in the direction in which the anomalous dispersion value increases; by increasing the thickness C of the B layer 2 of the waveguide core, the chromatic dispersion curve is rotated counterclockwise with the wavelength $\lambda_0$ as the center, wherein when the wavelength is less than 4, the chromatic dispersion curve moves in the direction in which the anomalous dispersion value decreases, and when the wavelength is greater than 4, the chromatic dispersion curve moves in the direction in which the anomalous dispersion value increases.

Example

As shown in FIG. 1-1, the core region of the selected optical waveguide structure comprises a double-layer structure of the A layer and the B layer formed of two different materials, where the material 2 of the B layer, i.e., the outer layer, is $Ge_{15}Sb_{20}S_{65}$, and its refractive index is about 2.2; the material 1 of the A layer, i.e., the inner layer, is $Ge_{30}Sb_{10}Se_{60}$, and its refractive index is about 2.65; the refractive index ratio of the two materials is about 1.2; the material of the substrate 3 is $CaF_2$, and its refractive index is about 1.43; the cladding layer is air; and the sidewall angle $\alpha$ of the waveguide core is 87°. The FEM algorithm is used to calculate the effective refractive index of the TE mode fundamental mode in this waveguide structure, and a chromatic dispersion is calculated according to the obtained effective refractive index. First, a set of parameters are preset, including the width W of the contact surface between the waveguide core and the substrate 3 being 2350 nm, the height H of the A layer 1 being 1800 nm, and the height C of the B layer 2 being 1350 nm, and then with the above method, a curve of chromatic dispersion with respect to wavelength can be obtained. This curve has 5 zero-dispersion wavelengths, which are 2.94, 4.18, 7.36, 11.32 and 14.86 μm, respectively. And the chromatic dispersion curve is very flat, as shown with the solid line in the middle position in FIG. 2-1. The difference between the maximum and the minimum of the chromatic dispersion is 23 ps/nm/km, while the corresponding bandwidth is 3 to 15 μm, which exceeds two octaves.

By merely increasing the width W of the contact surface between the waveguide core and the substrate 3 to W=2500 nm, the chromatic dispersion curve is shifted as a whole in the direction in which the anomalous dispersion value increases, with an amount of shifting being about 15 ps/nm/km, on the contrary, by reducing the width to W=2200 nm, the curve is shifted as a whole in the direction in which the anomalous dispersion value decreases, with an amount of shifting being about −15 ps/nm/km, as shown in FIG. 2-1.

By merely increasing the thickness H of the high-index material (that is, the inner layer material 1) to H=1900 nm, the curve is shifted as a whole in the direction in which the chromatic dispersion value increases, with an amount of shifting being about 12 ps/nm/km, on the contrary, by reducing the thickness H to H=1700 nm, the curve is shifted as a whole in the direction in which the anomalous dispersion value decreases, with an amount of shifting being about −12 ps/nm/km, as shown in FIG. 2-2.

By merely increasing the thickness C of the low-index material (i.e., the layer B) to C=1400 nm, the dispersion curve rotates counterclockwise with the specific wavelength $\lambda_0$=10 μm as the center of rotation, where when the wavelength is less than 10 μm, it moves in the direction in which the anomalous dispersion value decreases, and the overall average movement amount is about −6 ps/nm/km, and when the wavelength is greater than 10 μm, it moves in the direction in which the anomalous dispersion value increases, and the overall average movement amount is about 9 ps/nm/km. On the contrary, by reducing the thickness to C=1300 nm, the dispersion curve rotates clockwise with the wavelength $\lambda_0$=10 μm as the center of rotation, where when the wavelength is less than 10 μm, it moves in the direction in which the anomalous dispersion value increases, and the overall average movement amount is about 6 ps/nm/km, and when the wavelength is greater than 10 μm, it moves in the direction in which the anomalous dispersion value decreases, and the overall average movement amount is about −9 ps/nm/km, as shown in FIG. 2-3.

With the present disclosure, controlling of the chromatic dispersion can be realized by flexibly changing the values of the three structural parameters (W, H, and C).

Optical resonance devices and optical interference devices derived based on the cross section of the optical waveguide structure of the present disclosure include at least micro-ring resonator, Mach-Zindel Interferometer and a FP cavity using the cross section of the optical waveguide structure of the present disclosure.

Although the present disclosure has been described above in conjunction with the accompanying drawings, the present disclosure is not limited to the specific embodiments described above. The described specific embodiments are only illustrative, but not restrictive. Under the enlightenment of the present disclosure, the skilled in this art could make many modifications without departing from the purpose of the present disclosure, which all fall into the protection scope of the present disclosure.

What is claimed is:

1. A broadband dispersion controlling waveguide, comprising a waveguide core located on a substrate, wherein the waveguide core is provided with a cladding layer; the waveguide core comprises an A layer and a B layer composed of materials with different refractive indices, the ratio of the refractive indices of the materials for the A layer and the B layers is ≥1.15,
   characterized in that the A layer partially covers the substrate, thus forming a combined body of the A layer and the substrate, the B layer covers an upper side of the combined body, the A layer has a rectangular or trapezoid cross section, and a width W of a contact surface between the A layer and the substrate, a thickness H of the A layer of the waveguide core, and a thickness C of the B layer of the waveguide core are configured in such a way that the broadband dispersion controlling waveguide has a chromatic dispersion curve whose dispersions are controlled within a range of −100~+100 ps/nm/km in a wavelength range.

2. The broadband dispersion controlling waveguide according to claim 1, characterized in that an upper part of the substrate has a through groove along a light transmission direction.

3. The broadband dispersion controlling waveguide according to claim 2, characterized in that a top part of the substrate comprises a support layer for the waveguide core.

4. The broadband dispersion controlling waveguide according to claim 1, characterized in that the materials of the A layer and the B layer are selected from the same combination or from different combinations of a first combination, a second combination and a third combination;
the first combination is a chalcogenide glass combination comprising S-based glass of lower refractive index and Se-based glass and Te-based glass of higher refractive index;
the second combination at least comprises $TiO_2$, $HfO_2$, $Al_2O_3$, $SiO_2$, $Ga_2O_3$, $Ta_2O_3$, and $Bi_2O_3$; and
the third combination at least comprises Ge, SiC, Si, $Ge_xSi_y$, Diamond, GaN, AlN, $Si_xN_y$, InP, GaAs, $LiNbO_3$.

5. The broadband dispersion controlling waveguide according to claim 4, characterized in that the S-based glass at least comprises $Ge_2S_3$, $As_2S_3$, $Ge_xAs_yS_z$ and $Ge_xP_yS_z$, the Se-based glass at least comprises $Ge_2Se_3$, $As_2Se_3$, $Ge_xAs_ySe_z$, $Ge_xSb_ySe_z$ and $Ge_xP_ySe_z$, and the Te-based glass at least comprises $Ge_xSb_yTe_z$, $Ge_xSe_yTe_z$ and $As_xSe_yTe_z$, wherein x, y, z represent different mole percentage, and x+y+z=100; and the x and y in the third combination represent different mole percentage, and x+y=100.

6. The broadband dispersion controlling waveguide according to claim 1, wherein the wavelength range is larger than 0.3 octave.

7. The broadband dispersion controlling waveguide according to claim 1, wherein the chromatic dispersion curve is convex from a shortest wavelength of the wavelength range to a first wavelength of the wavelength range, and is concave from the first wavelength to a second wavelength of the wavelength range.

8. The broadband dispersion controlling waveguide according to claim 7, wherein the chromatic dispersion curve is convex from the second wavelength to a third wavelength of the wavelength range.

9. The broadband dispersion controlling waveguide according to claim 8, wherein the chromatic dispersion curve is concave from the third wavelength to a fourth wavelength of the wavelength range.

10. The broadband dispersion controlling waveguide according to claim 1, wherein the chromatic dispersion curve has 5 zero-dispersion wavelengths.

11. The broadband dispersion controlling waveguide according to claim 1, wherein the chromatic dispersion curve has dispersions within a range of −100~+100 ps/nm/km over a broadband wavelength range of two octaves.

12. An optical resonance device and an optical interference device based on a broadband dispersion controlling waveguide, characterized in that a cross section of the optical resonance device and the optical interference device uses a cross section of a broadband dispersion controlling waveguide comprising a waveguide core located on a substrate, wherein:
the waveguide core is provided with a cladding layer; the waveguide core comprises an A layer and a B layer composed of materials with different refractive indices, a ratio of the refractive indices of the materials for the A layer and the B layers is ≥1.15, the A layer partially covers the substrate, thus forming a combined body of the A layer and the substrate, the B layer covers an upper side of the combined body, the A layer has a rectangular or trapezoid cross section; and
the width W of the contact surface between the A layer and the substrate, the thickness H of the A layer of the waveguide core, and the thickness C of the B layer of the waveguide core are configured in such a way that the broadband dispersion controlling waveguide has a chromatic dispersion curve whose dispersions are controlled within a range of −100~+100 ps/nm/km in a wavelength range.

13. The optical resonance device and the optical interference device based on the broadband dispersion controlling waveguide according to claim 12, characterized in that the optical resonance device includes at least micro-ring resonator cavity and a FP cavity, the optical interference device includes at least Mach-Zindel Interferometer.

14. A method for controlling chromatic dispersion based on a broadband dispersion controlling waveguide, characterized in that, the broadband dispersion controlling waveguide comprises a waveguide core located on a substrate, wherein the waveguide core is provided with a cladding layer; the waveguide core comprises an A layer and a B layer composed of materials with different refractive indices, a ratio of the refractive indices of the materials for the A layer and the B layers is ≥1.15; the A layer partially covers the substrate, thus forming a combined body of the A layer and the substrate, the B layer covers an upper side of the combined body, the A layer has a rectangular or trapezoid cross section; and
the method comprises: by using the broadband dispersion controlling waveguide, first, designing a set of structural size parameters of the waveguide, the set of structural size parameters comprising the width W of the contact surface between the A layer and the substrate, the thickness H of the A layer of the waveguide core, and the thickness C of the B layer of the waveguide core; and then obtaining a chromatic dispersion curve based on the second derivative of the transmission constant of light in the waveguide with respect to wavelength.

15. The method for controlling the chromatic dispersion based on a broadband dispersion controlling waveguide according to claim 14, characterized in that the chromatic dispersion curve is a chromatic dispersion curve with up to 5 zero-dispersion wavelengths, and the chromatic dispersion curve is flat in a broadband wavelength range of two octaves.

16. The method for controlling the chromatic dispersion based on a broadband dispersion controlling waveguide according to claim 15, characterized in that, by increasing the width W of the contact surface between the A layer and the substrate, the chromatic dispersion curve is shifted as a whole in the direction in which an anomalous dispersion value increases; by increasing the thickness H of the A layer of the waveguide core, the chromatic dispersion curve is shifted as a whole in the direction in which the anomalous dispersion value increases; and by increasing the thickness C of the B layer of the waveguide core, the chromatic dispersion curve is rotated counterclockwise with the wavelength $\lambda_0$ as the center of rotation, where when the wavelength is less than $\lambda_0$, the chromatic dispersion curve moves in the direction in which the anomalous dispersion value decreases, and when the wavelength is greater than $\lambda_0$, the chromatic dispersion curve moves in the direction in which the anomalous dispersion value increases.

\* \* \* \* \*